US010625876B2

(12) United States Patent
Bosworth (10) Patent No.: US 10,625,876 B2
(45) Date of Patent: Apr. 21, 2020

(54) AIRCRAFT LANDING SYSTEMS AND METHODS FOR MONITORING A VERTICAL LANDING OF AN AIRCRAFT

(71) Applicant: Aurora Flight Sciences Corporation, Manassas, VA (US)

(72) Inventor: William R. Bosworth, Somerville, MA (US)

(73) Assignee: Aurora Flight Sciences Corporation, Manassas, VA (US)

( * ) Notice: Subject to any disclaimer, the term of this patent is extended or adjusted under 35 U.S.C. 154(b) by 57 days.

(21) Appl. No.: 16/058,530

(22) Filed: Aug. 8, 2018

(65) Prior Publication Data

US 2020/0047916 A1    Feb. 13, 2020

(51) Int. Cl.
*G08G 5/00* (2006.01)
*B64D 45/04* (2006.01)
*B64C 25/52* (2006.01)
*G01L 5/00* (2006.01)

(52) U.S. Cl.
CPC .............. *B64D 45/04* (2013.01); *B64C 25/52* (2013.01); *G01L 5/0052* (2013.01); *G08G 5/0008* (2013.01); *G08G 5/0086* (2013.01)

(58) Field of Classification Search
CPC ....... B64D 45/04; B64C 25/52; G01L 5/0052; G08G 5/0008; G08G 5/0086
USPC .......................................................... 701/16
See application file for complete search history.

(56) References Cited

U.S. PATENT DOCUMENTS

| 4,850,552 A | 7/1989 | Darden et al. |
| 9,994,307 B2 | 6/2018 | Nguyen et al. |
| 2011/0139928 A1* | 6/2011 | Morris .................... B64C 27/02 244/1 TD |
| 2013/0008998 A1* | 1/2013 | Morris .................... B64C 27/02 244/3 |
| 2013/0313359 A1* | 11/2013 | Morris .................... B64C 27/02 244/1 TD |
| 2016/0327958 A1 | 11/2016 | Vallart et al. |

FOREIGN PATENT DOCUMENTS

| DE | 2010 020445 | 11/2011 |
| WO | WO 88/08391 | 11/1998 |
| WO | WO 2013/132114 | 9/2013 |
| WO | WO 2014/055269 | 4/2014 |
| WO | WO 2016/149545 | 9/2016 |
| WO | WO 2017/175212 | 10/2017 |

OTHER PUBLICATIONS

European Patent Office, "Extended European Search Report," App. No. 19188385.9 (dated Dec. 6, 2019).

* cited by examiner

Primary Examiner — Gertrude Arthur Jeanglaude
(74) Attorney, Agent, or Firm — Walters & Wasylyna LLC (57) ABSTRACT

An aircraft landing system for landing of an aircraft includes at least one force sensor and a processor. The at least one force sensor is coupled with a landing gear of the aircraft for sensing forces applied to the landing gear at a plurality of positions during landing at a landing zone. The processor is configured to receive force measurements from the at least one force sensor.

21 Claims, 9 Drawing Sheets

FIG. 11

AIRCRAFT LANDING SYSTEMS AND METHODS FOR MONITORING A VERTICAL LANDING OF AN AIRCRAFT

FIELD

The present application relates to aircraft landing systems and methods for monitoring a landing of an aircraft.

BACKGROUND

Helicopters and other aircraft preferably land on flat, hard and even surfaces.

For vertical landing and short landing of manned aircraft, pilots typically rely on visual information from the external environment to select an appropriate location for landing. For manned or unmanned aircraft, optical sensors and other sensors may be used to assess the suitability of terrain prior to landing on the terrain. For autonomous aircraft, optical sensors are typically relied upon for selecting an appropriate location for landing. Although pilots and sensors may visually assess these surfaces, some obstacles may remain undetected or undetectable by the pilot or by conventional sets of sensors. These obstacles present challenges when assessing suitability of some types of terrain for landing. Also, visual cues and conventional sensors may not be accurate enough to assess the stability of the landing zone.

Accordingly, those skilled in the art continue with research and development in the field of aircraft landing systems and methods for monitoring a landing of an aircraft.

SUMMARY

In one embodiment, an aircraft landing system for landing of an aircraft includes at least one force sensor and a processor. The at least one force sensor is coupled with a landing gear of the aircraft for sensing forces applied to the landing gear at a plurality of positions during landing at a landing zone. The processor is configured to receive force measurements from each of the at least one force sensor.

In another embodiment, a method for monitoring a landing of an aircraft includes sensing forces applied to a landing gear at a plurality of positions during landing at a landing zone and determining a suitability of the landing zone for landing.

Other embodiments of the disclosed aircraft landing systems and methods for monitoring a landing of an aircraft will become apparent from the following detailed description, the accompanying drawings and the appended claims.

DETAILED DESCRIPTION

According to the present disclosure, there is an aircraft landing system for landing of an aircraft. The aircraft landing system includes at least one force sensor coupled with a landing gear of the aircraft for sensing forces applied to the landing gear at a plurality of positions during landing and a processor configured to receive force measurements from each of the at least one force sensor. In an aspect, the processor is further configured determine a suitability of the landing zone for landing.

The aircraft landing system is applicable for any aircraft, including manned aircraft, remote-controlled unmanned aircraft, and autonomous aircraft, and including fixed wing aircraft and rotary wing aircraft. In an exemplary aspect, the aircraft landing system is employed with vertically landed aircraft (e.g., VTOL aircraft) or short takeoff and landing aircraft (e.g., STOL aircraft).

Figure 1:
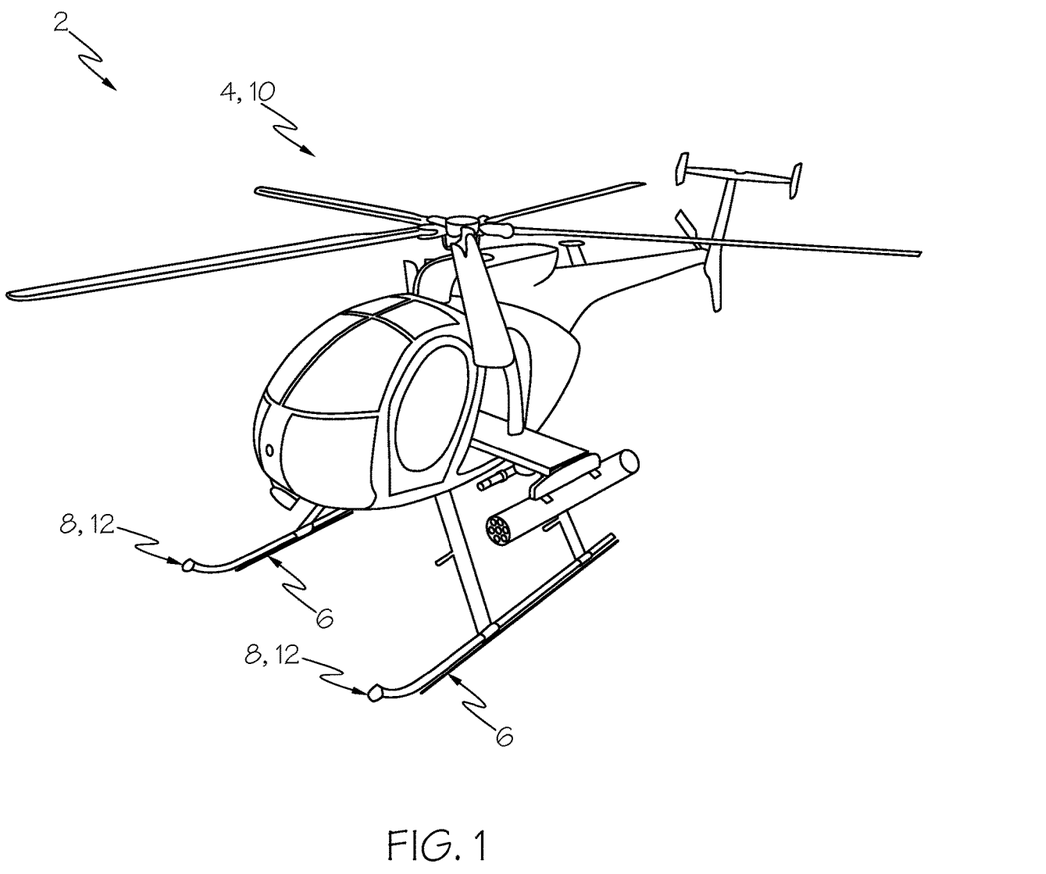
FIG. 1 is a schematic perspective view of an aircraft landing system including a plurality of force sensors.
Figure 2:
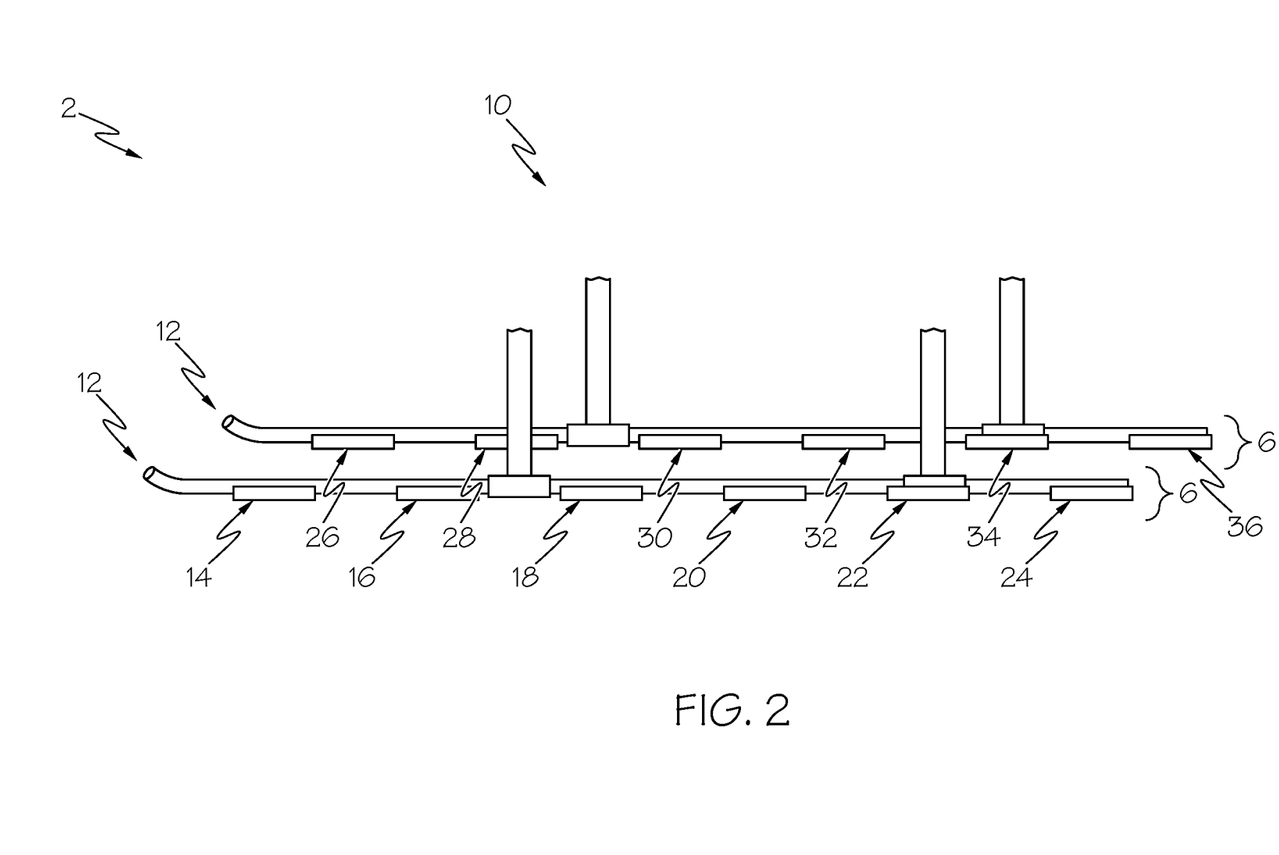
FIG. 2 is another schematic perspective view of the aircraft landing system of FIG. 1 including the plurality of force sensors.
Figure 3:
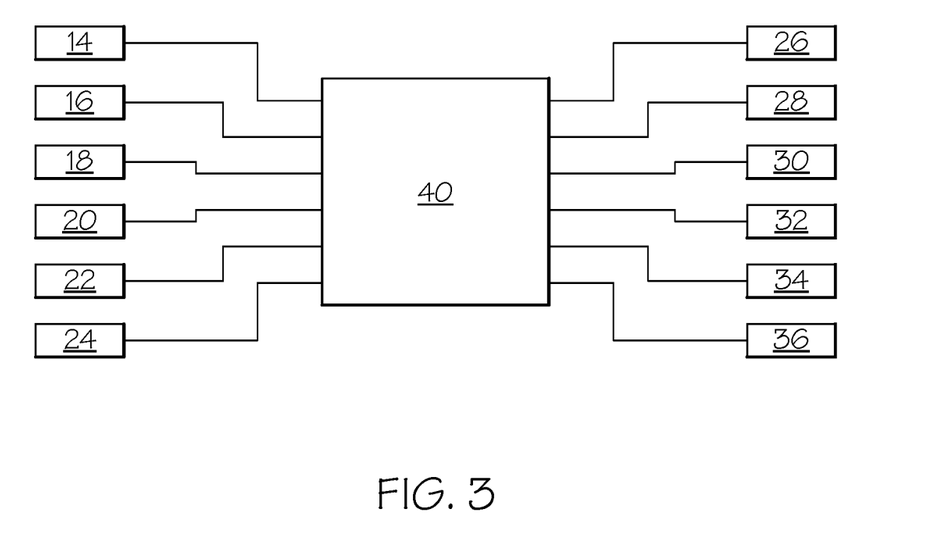
FIG. 3 is a schematic view of the aircraft landing system of FIG. 1 including the plurality of force sensors and a processor.

FIGS. 1-3 depict an exemplary aircraft landing system 2 for landing of an aircraft 4.

Referring to FIG. 1, the aircraft landing system 2 includes a plurality of force sensors 6 coupled with a landing gear 8 of the aircraft 4 for sensing forces applied to the landing gear 8 at a plurality of positions during landing. The landing gear includes any landing skids or other structural components that contact a terrain when landing. In the illustrated example, the aircraft 4 is a helicopter 10, and the landing gear 8 includes skids 12 (e.g. skid plates) of the helicopter 10, wherein the plurality of force sensors 6 are coupled with the skids 12 of the helicopter 10.

As illustrated, the plurality of force sensors 6 are positioned on a bottom of the skids 12 of the helicopter 10 to directly sense forces applied to the plurality of force sensor 6 during landing. However, the plurality of force sensors 6 may be positioned in any manner that permits the force sensors 6 to sense forces applied to the skids as a result of the landing. For example, the plurality of force sensors 6 can be added onto the bottom of existing helicopter skids either by converting existing helicopter, or on future helicopters with conventional skids.

In an aspect, the plurality of force sensors 6 are load cells, of which there are many types.

The most common load cell includes a tuned mechanical flexure, a strain gauge, and an instrumentation amplifier. A strain gauge (or multiple strain gauges placed in a configuration to reduce noise and thermal effects) is a material that changes resistance when stretched or compressed. When the strain gauge is attached to a tune mechanical flexure and the flexure deflects, then the resistance of strain gauge changes. The instrumentation amplifier converts small changes in resistance of the strain gauge to voltages suitable for normal data acquisition. Another type of load cell uses a mechanical flexure but measures change in capacitance between two plates, instead of pure mechanical contact.

Another type of load cell includes an embedded strain gauge (e.g. embedded into rubber material). Yet another type of load cell includes force resisting sensors, which are polymer thick film devices that exhibit a decrease in resistance with increased force applied to the device.

Yet another type of load cell includes tapes that measure contact along a line. For example, the tapes may be applied to interior surfaces of a cylinder. If mechanical contact is made to compress the tape, the electrical contacts will touch (or move closer to each other), resulting in an electrical signal. Different sections of the tape can be electrically isolated from each other to make the tape able to sense contact at different parts of the surface.

Yet another type of load cell includes magnets into a flexure and the load cell uses hall effect sensors to measure motion of the magnet.

Yet another type of load cell uses optical sensors to measure the change in deflection.

By way of the plurality of force sensors 6, the aircraft landing system 2 can analyze the force measurements received from the force sensor 6 and determine whether a landing zone is suitable for landing. For example, the aircraft landing system 2 can compare the forces sensed by the plurality of force sensors 6 to a predetermined threshold corresponding to an unsuitable landing zone. If one or more of sensed forces deviates from the predetermined threshold, then the aircraft landing system 2 can flag for an unsuitable landing zone Referring to FIG. 2, the plurality of force sensors 6 may include a plurality of force sensors 6 coupled with each skid 12. As illustrated, the plurality of force sensors 6 include first to sixth force sensors 14, 16, 18, 20, 22, 24 positioned in an array along a length of one of the skids 12 and seventh to twelfth force sensors 26, 28, 30, 32, 34, 36 positioned in an array along a length of the other of the skids 12. By providing a plurality of force sensors 6 coupled with each skid 12, the aircraft landing system 2 can independently sense forces applied to the plurality of force sensor 6 at the different positions of the plurality of force sensors 6. By sensing forces applied at different positions along the length of the skid 12, the aircraft landing system 2 can compare the sensed forces to detect a non-uniform application of force, which may be indicative of an unsuitable landing zone, which may result from a potential landing obstacle or soft terrain.

The aircraft landing system 2 further includes a processor 40 configured to receive force measurements from each of the plurality of force sensors 6. Referring to FIG. 3, the plurality of force sensors 6 are shown to be in signal communication with the processor 40 arranged on the skids 12.

By receiving the force measurement from the plurality of force sensors 6 to a common processor 40, the aircraft landing system 2 can compare the forces applied at the different positions of the plurality of force sensors 6.

The processor 40 is configured to determine a suitability of the landing zone for landing. In an aspect, the processor 40 is further configured to analyze the force measurements received from the force sensor 6. In another aspect, the processor 40 is further configured determine whether a landing zone is suitable for landing. For example, the processor 40 is configured to compare the forces sensed by the plurality of force sensors to a predetermined threshold corresponding to an unsuitable landing zone and to flag for an unsuitable landing zone when comparison of the sensed forces deviates from the predetermined threshold. In an alternative aspect, the processor 40 is configured to test multiple landing zones and compare the multiple landing zones to find the best landing zone.

By way of example, the processor 40 may be configured to determine a difference between a first force applied to the landing gear at a first position during landing and second force applied to the landing gear at a second position during landing and to compare the difference to a predetermined threshold corresponding to an unsuitable landing zone. For example, if the first force applied to the landing gear at a first position during landing is significantly greater than the second force applied to the landing gear at the second position during landing, then there may be a large rock or other obstacle hidden from view (e.g. under grass or plants). This scenario is further discussed below with reference to FIGS. 6 and 7.

Figure 8A:
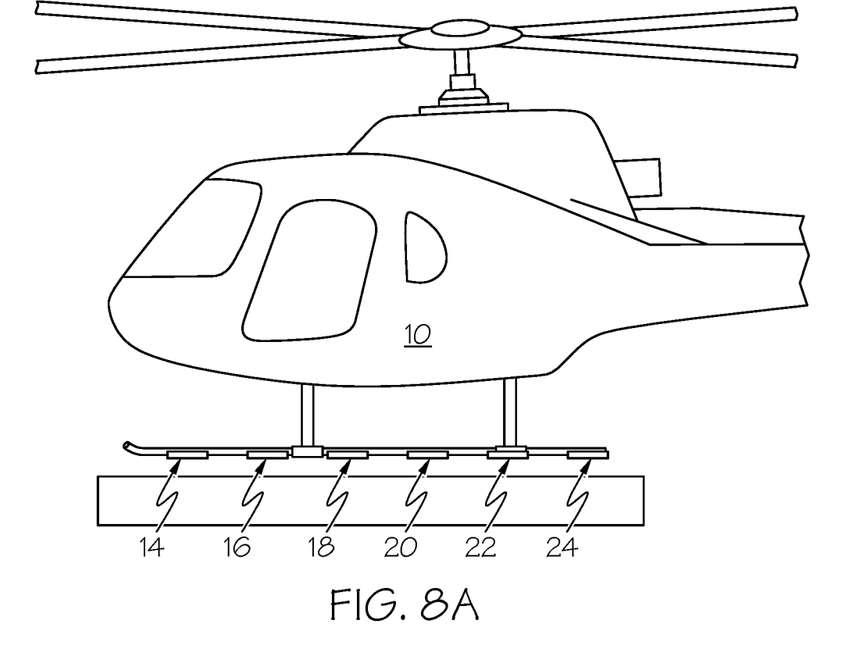
FIGS. 8A and 8B is a scenario showing an attempted landing in marsh using the method of FIG. 5.
Figure 8B:
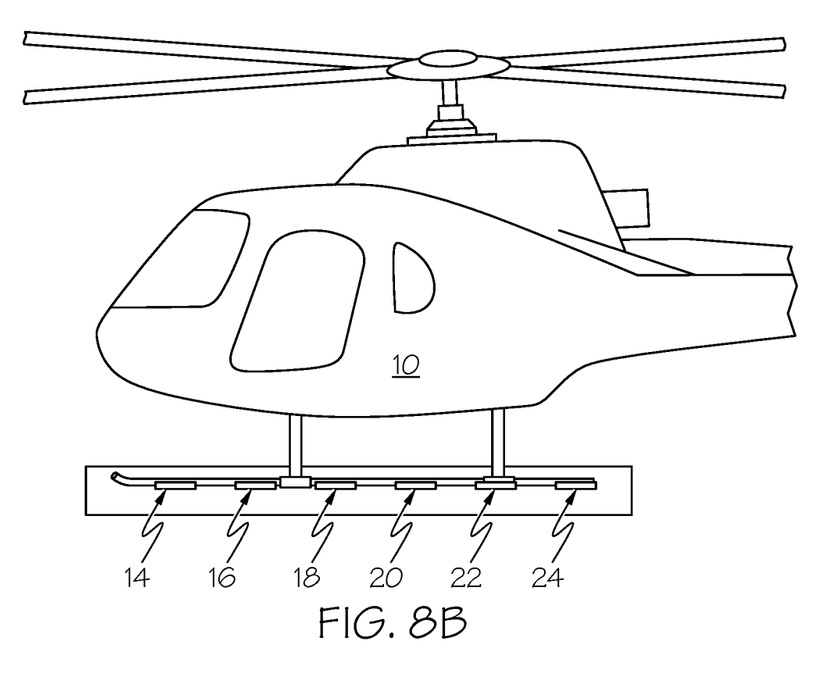

By way of another example, the processor 40 is further configured to determine the first force applied to the landing gear at a first position and to compare the first force to a predetermined threshold corresponding to the unsuitable landing zone. For example, if the first force applied to the landing gear at a first position during landing is significantly less than a predetermined threshold, then the ground may not have sufficient stiffness or may not be sufficiently load bearing. This scenario is further discussed below with reference to FIGS. 8 and 9.

In an aspect, the processor 40 is further configured to flag for an unsuitable terrain for landing. Flagging for an unsuitable landing zone may include a variety of actions depending on the incorporation of the aircraft landing system 2 into the aircraft 4. For example, for a manned aircraft 4, flagging for an unsuitable landing zone may include transmitting an alert to flight deck to be observed by the pilot of the aircraft 4. For an unmanned, remote-controlled aircraft, flagging for an unsuitable landing zone may include transmitting an alert to the remote controller the aircraft 4. For an autonomous aircraft 4, flagging for an unsuitable landing zone may include transmitting an alert to a flight control system of the autonomous aircraft 4, the command indicating whether the distribution of forces is sufficiently equal for a safe landing or whether the landing should be aborted. Flagging for an unsuitable landing zone may additionally include transmitting an alert to an external authority for data collection.

If the aircraft landing system 2 is in communication with a flight control system, then the flagging for an unsuitable landing zone may include issue a command to the flight control system based on the flag for the unsuitable landing zone. Thus, the processor 40 may be configured to issue a command to the flight control system based on the flag for the unsuitable landing zone. As a result of the command, the landing of the aircraft 4 may be diverted to avoid the unsuitable landing zone. The flight control system may then look for another landing zone.

The aircraft landing system 2 may be in communication with or integrated with the flight control system. If the aircraft landing 2 assesses unsafe terrain, it will inform the flight control system to abort the landing. The aircraft landing system 2 can also confirm that safe landing has been achieved. Thus, the aircraft landing system 2 will enable the aircraft 4 to land faster than only using a conventional flight control system. A conventional flight control method would require error in the state of the aircraft to call off a landing, whereas the aircraft landing system 2 can measure terrain before any negative effects cause deviations in the aircraft itself.

The aircraft landing system 2 may be in communication with or integrated with another autonomous landing system, which, among other things, uses optical sensors to assess the flatness of terrain and detected obstacles prior to landing on the terrain. Such optical sensors have challenges when sensing some terrain. For example, the optical sensors may not see objects (e.g. large rocks or large holes) that are in a terrain that has tall grass. Also, optical sensors have challenges assessing mechanical properties—e.g., the stiffness of the ground, or whether the ground is load bearing. The aircraft landing system 2 can assist the autonomous landing system to quickly assess ground integrity allowing a manned or unmanned aircraft to operate faster and with more safety around terrain that is not well known to the operator.

Figure 4:
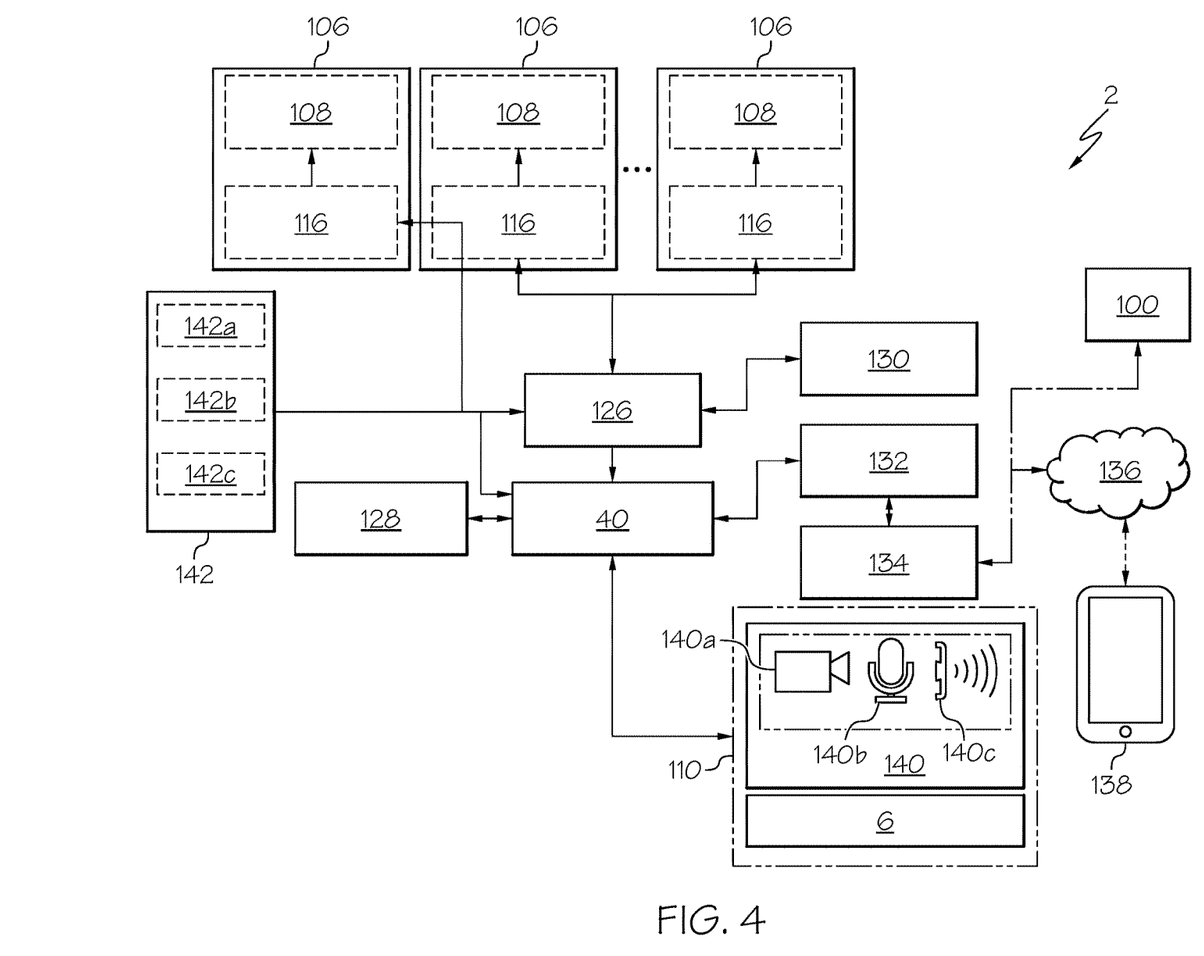
FIG. 4 is a schematic diagram of a detailed aircraft landing system according to an exemplary embodiment.

FIG. 4 is a schematic diagram of an exemplary aircraft landing system 2 according to a non-limiting example of the present description. As shown in FIG. 4, the aircraft landing system 2 of the present description includes sensors 110. Sensors 110 include force sensors 6 and an intelligence, surveillance and reconnaissance (ISR) payload 140. ISR payload 140 includes, for example, first sensors 140a, second sensors 140b, and third sensors 140c, which may include, for example, acoustic sensors and/or the optical sensors.

As shown in FIG. 4, the aircraft landing system 2 further includes the processor 40 in communication with the sensors 110, including the force sensors 6. Thus, the processor 40 can analyze the force measurements received from the force sensors 6, and the processor can analyze data from the other sensors 140a, 140b, 140c, such as acoustic sensors and/or the optical sensors. Based on the force measurement, optionally together with data from the other sensors 140a, 140b, 140c, the process can determine a suitability of the landing zone for landing and flag for an unsuitable landing zone based on the suitability of the landing zone for landing.

As shown in FIG. 4, the aircraft landing system 2 further includes a memory device 128 in communication with the processor 40. The memory device 128 includes any storage device configured to include instructions executable by the processor to perform functions described in the present application.

As shown in FIG. 4, the aircraft landing system 2 further includes a wireless transceiver 132 and antennae 134 for communication external to the aircraft, such as an external device 138 via network 136 or to other vehicles 100. Thus, when an unsuitable landing zone is identified, the aircraft landing system can transmit an alert or command to the external device 138 or to one or more of the other vehicles 100. For example, the aircraft landing system 2 can issue a command to a flight control system of the other aircrafts based on the identification of the unsuitable landing zone to direct the other aircrafts 100 to another landing zone. In another example, the aircraft landing system 2 may issue a command or send a signal to the flight control system of the other aircraft via the network 136 to communicate the locations of the unsuitable landing zone based on the unsuitable landing zone identified by the aircraft landing system 2.

In a specific example, multiple aircraft can be in flight with one lead aircraft equipped with force sensors 6. The lead aircraft identifies a safe landing zone based on the force sensors 6 and transmits the location to the other of the multiple aircraft or directly sends signals for the other aircraft to land at the safe landing zone. The lead aircraft may then continue to identify safe landing zones for each of the multiple aircraft until all aircraft are landed or safe landing zones are designated to all of the multiple aircraft.

As shown in FIG. 4, the aircraft landing system 2 further includes flight control system 126, in communication with processor 40, for controlling the flight of the aircraft and navigation system 142 for providing navigation and guidance to the flight of the aircraft. The navigation system 142 includes, for example, global positioning system (GPS) 142a, inertia navigation system (INS) 142b, and inertial measurement unit (IMU) 142c. For example, the navigation system 142 enables the aircraft to navigate to a designated landing zone or area identified as sage. Alternatively, the location of an unsuitable landing zone identified by one aircraft can be communicated to another aircraft using the locational information made available by the navigation system 142.

As shown in FIG. 4, the aircraft landing system 2 further includes thrust generator 106 in communication with the flight control system 126 and/or the navigation system 142 for actuating the control of the aircraft. In this example, the thrust generator 106 includes electronic speed control (ESC) 116 and electric motor 108 for controlling the speed of the propeller driven by each of the electric motor 108.

Figure 5:
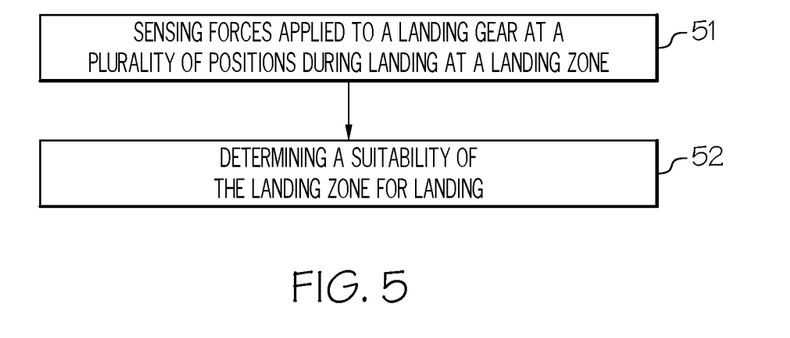
FIG. 5 is a flow chart of a method for monitoring a landing of an aircraft using the aircraft landing system of FIG. 1.

As shown in FIG. 5, there is a method 50 of monitoring a landing of the aircraft 4. The method 50 includes, at block 51, sensing forces applied to a landing gear at a plurality of positions during landing at a landing zone, and, at block 52, determining a suitability of the landing zone for landing.

The method 50 is applicable for any vertically landed aircraft, including manned aircraft, remote-controlled unmanned aircraft, and autonomous aircraft, and including fixed wing aircraft and rotary wing aircraft. In a specific example, the aircraft is a helicopter, and the landing gear includes skids of the helicopter.

Referring to block 51, the step of sensing forces applied to a landing gear at a plurality of positions during landing at a landing zone may be performed by at least one force sensor coupled with the skids of the helicopter for sensing forces applied to the skids at the plurality of positions during landing. In an aspect, a plurality of force sensors are positioned on a bottom of the skids. However, the position of the force sensors are not limited by any specific position. The plurality of force sensors may be coupled with the skid by any manner as described above with reference to FIGS. 1-3.

Referring to block 52, the step of determining a suitability of the landing zone for landing may include comparing the sensed forces to a predetermined threshold corresponding to an unsuitable landing zone may include determining a difference between a first force applied to the landing gear at a first position during landing and second force applied to the landing gear at a second position during landing or comparing the difference to a predetermined threshold corresponding to an unsuitable landing zone unsuitable landing zone. Thus, any force sensor sensing a force measurement deviating from (beyond a predetermined threshold) the remaining force sensors can indicate for an unsuitable landing zone. For example, if a first force applied to the landing gear at a first position during landing is significantly greater than a second force applied to the landing gear at a second position during landing, then there may be a large rock or other obstacle hidden from view (e.g. under grass or plants). This scenario is further discussed below with reference to FIGS. 6 and 7 as follows.

Figure 6:
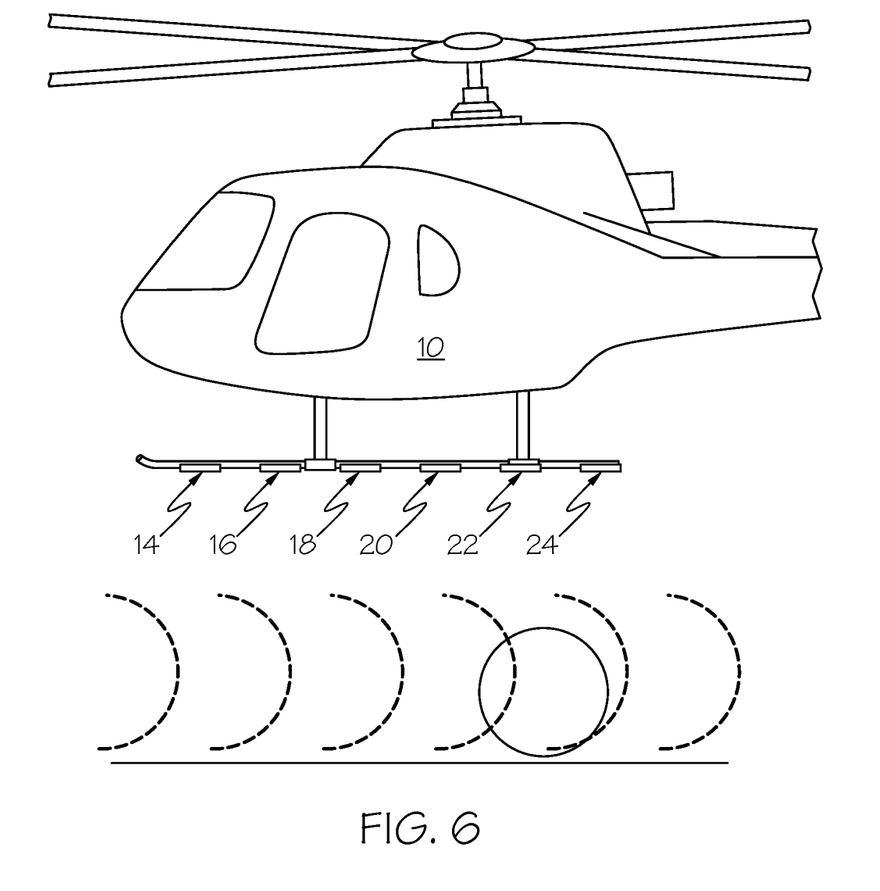
FIG. 6 is a scenario showing an attempted landing in tall grass using the method of FIG. 5.
Figure 7:
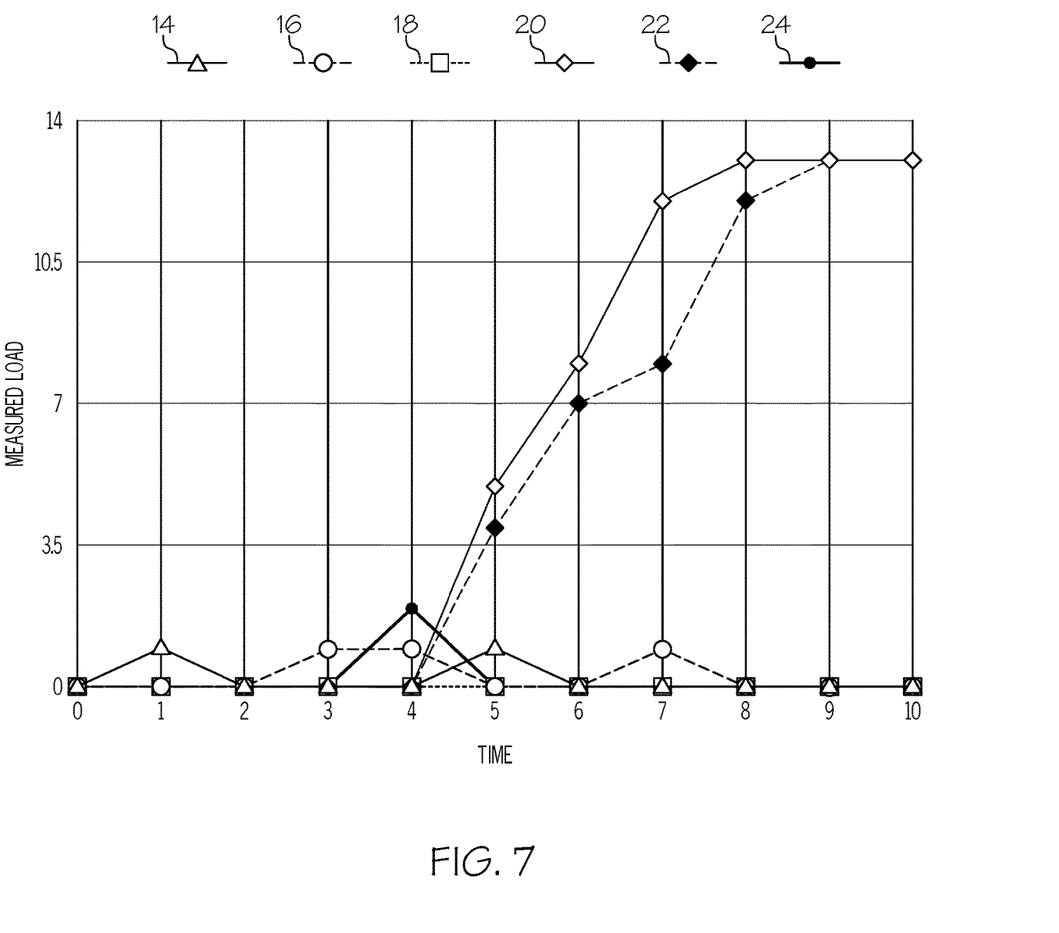
FIG. 7 is a graph showing a measured force during the attempted landing of FIG. 6.

FIGS. 6 and 7 relate to a non-limiting example showing an attempted landing by an aircraft according to the aircraft landing system. FIG. 6 shows a plurality of force sensors coupled with skids of a helicopter, in particular, a first force sensor 14, a second force sensor 16, a third force sensor 18, a fourth force sensor 20, a fifth force sensor 22, and a sixth force sensor 24. FIG. 7 is a graph showing a measured force as sensed by each of the force sensors during an attempted landing. As represented by FIG. 7, the fourth sensor 20 and the fifth sensor 22 have a significantly higher measured force than the measured force of the first sensor 14, second sensor 16, third sensor 18 and sixth sensor 24, which is indicative that there may be a large rock or other obstacle undetected by other sensors (e.g., under grass or plants) or which is indicative of the terrain being too soft (e.g., sand, water, mud, as examples). In other words, forces are only measured on some regions of the skid indicating the presence of a large boulder that may cause tipping or the presence of a soft terrain that may not support landing. Thus, the aircraft landing system 2 can flag for an unsuitable landing zone because comparison of the fourth and fifth sensed forces deviates from the predetermined threshold corresponding to a potential large rock or other obstacle hidden from view.

The aircraft landing system can further correlate with or combine analysis from multiple sensors inputs to identify the best landing, such as by combination of optical sensors and force sensors. By way of example, an optical sensor may identify a difference in visual identifiers, such as, color and texture, between patches of terrain, but the optical sensor may not correlate a landing suitability with the difference in visual identifiers. The force sensor of the present description may determine a suitability for landing of each patch of terrain, and the system may correlate the results of the force sensor with the differences in visual identifiers detected by the optical sensor to determine which patches are best for landing. With the optical sensor assisting, it can be estimated that the certain color of the terrain (or other visual cues) has the same force sensor input. By way of example, an optical sensor may identify a wet surface, but not knowing it's safe or not to land compared to a dry surface. Optical sensors may be able to identify wet or dry, then the force sensor can identify which one is best for landing between the two. A similar correlation of multiple sensor inputs can be achieved between laser-based sensor (e.g., LIDAR) and the force sensor to determine the suitability of a landing zone.

Returning to block 52, the step of comparing the sensed forces to a predetermined threshold corresponding to an unsuitable landing zone may include determining the first force applied to the landing gear at a first position comparing the first force to a predetermined threshold corresponding to an unsuitable landing zone. For example, if the first force applied to the landing gear at a first position during landing is significantly less than a predetermined threshold, then the ground may not have sufficient stiffness or may not be sufficiently load bearing. This scenario is further discussed below with reference to FIGS. 8 and 9 as follows.

Figure 9:
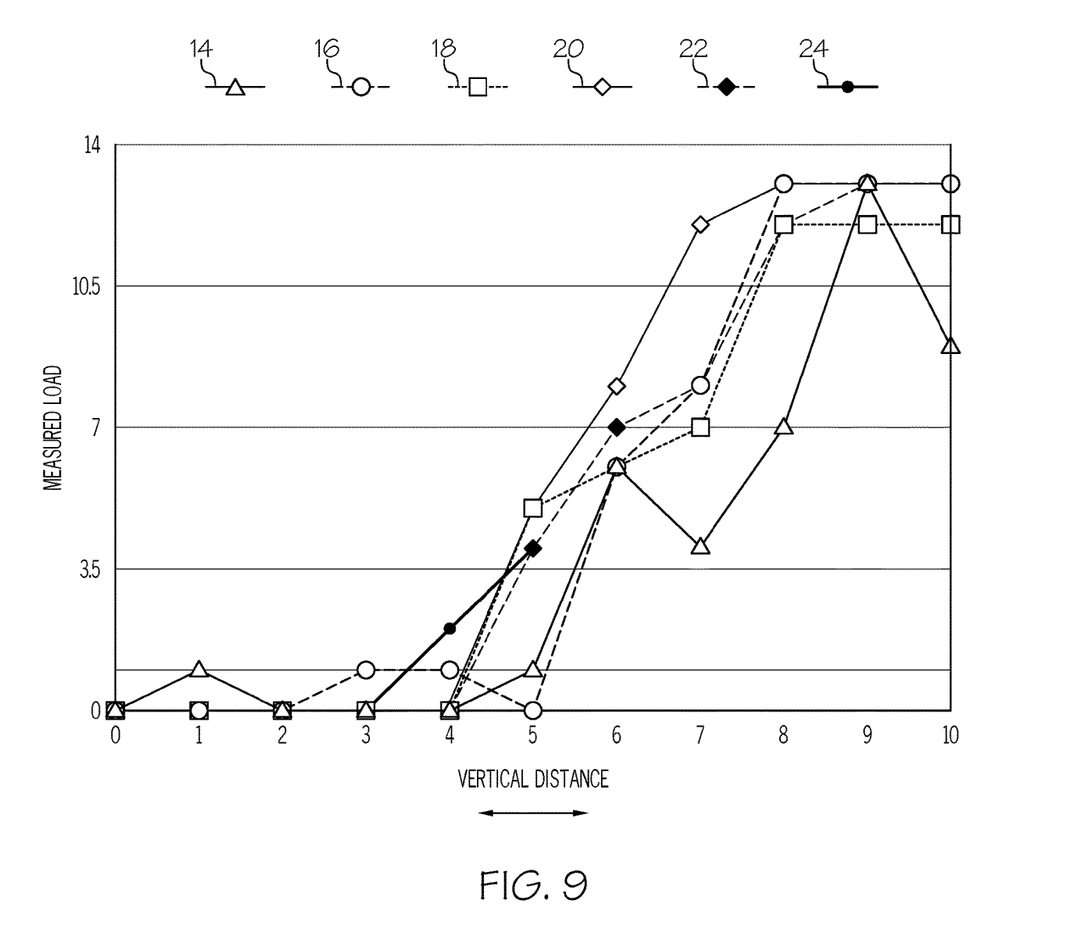
FIG. 9 is a graph showing a measured force during the attempted landing of FIGS. 8A and 8B.

FIGS. 8 and 9 relate to another non-limiting example showing an attempted landing by an aircraft according to the aircraft landing system. FIG. 8 shows a plurality of force sensors coupled with skids of a helicopter, in particular, a first force sensor 14, a second force sensor 16, a third force sensor 18, a fourth force sensor 20, a fifth force sensor 22, and a sixth force sensor 24. FIG. 9 is a graph showing a measured force as sensed by each of the force sensors during an attempted landing. As represented by FIG. 9, the forces applied to the landing gear are significantly less than expected based on the vertical distance travelled indicating that the terrain is too soft to land on. The soft terrain may be marsh, snow, muddy ground, or any other soft terrain. Thus, the aircraft landing system 2 can flag for an unsuitable landing zone because comparison of the sensed forces are less than a predetermined threshold corresponding to a potentially soft terrain.

Referring to block 53, the step of flagging for an unsuitable landing zone when comparison of the sensed forces deviates from the predetermined threshold may include a variety of actions depending on the incorporation of the aircraft landing system 2 into the aircraft 4. For example, for a manned aircraft 4, flagging for an unsuitable landing zone may include transmitting an alert to flight deck to be observed by the pilot of the aircraft 4. For an unmanned, remote-controlled aircraft, flagging for an unsuitable landing zone may include transmitting an alert to the remote controller the aircraft 4. For an autonomous aircraft 4, flagging for an unsuitable landing zone may include transmitting an alert to a flight control system of the autonomous aircraft 4, the command indicating whether the distribution of forces is sufficiently equal for a safe landing or whether the landing should be aborted.

Flagging for an unsuitable landing zone may additionally include transmitting an alert to an external authority for data collection. If the aircraft landing system 2 is in communication with a flight control system, then the processor 40 may be configured to issue a command to the flight control system based on the flag for the unsuitable landing zone. Thus, the landing of the aircraft 4 is diverted to avoid the unsuitable landing zone.

Figure 10:
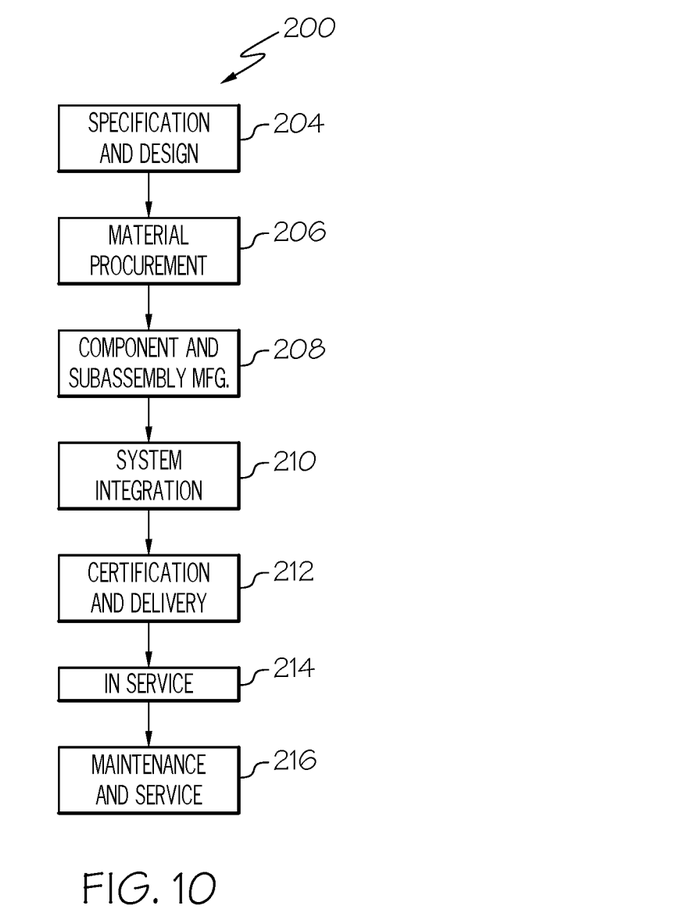
FIG. 10 is a flow diagram of an aircraft manufacturing and service methodology.
Figure 11:
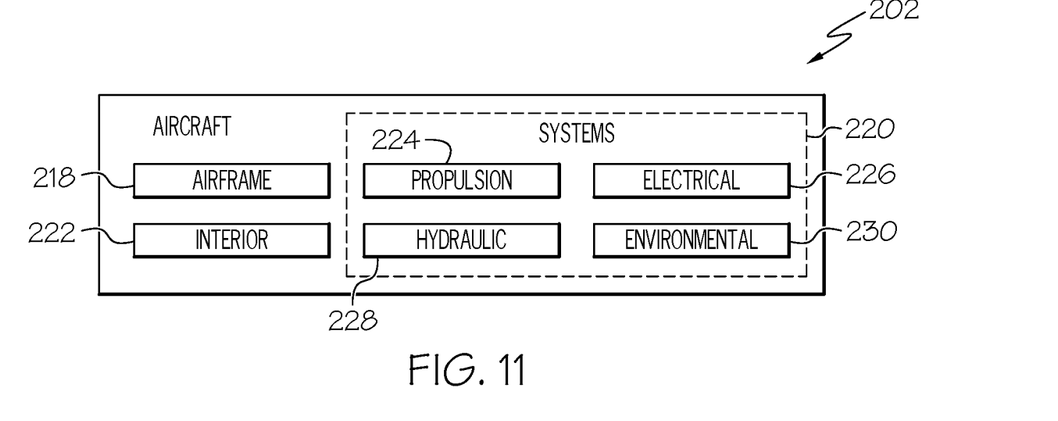
FIG. 11 is a block diagram of an aircraft.

Examples of the present disclosure may be described in the context of an aircraft manufacturing and service method 200, as shown in FIG. 10, and an aircraft 202, as shown in FIG. 11. During pre-production, the aircraft manufacturing and service method 200 may include specification and design 204 of the aircraft 202 and material procurement 206. During production, component/subassembly manufacturing 208 and system integration 210 of the aircraft 202 takes place. Thereafter, the aircraft 202 may go through certification and delivery 212 in order to be placed in service 214. While in service by a customer, the aircraft 202 is scheduled for routine maintenance and service 216, which may also include modification, reconfiguration, refurbishment and the like.

Each of the processes of method 200 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

The aircraft landing systems and methods for monitoring a landing of an aircraft of the present disclosure may be employed during any one or more of the stages of the aircraft manufacturing and service method 200, including specification and design 204 of the aircraft 202, material procurement 206, component/subassembly manufacturing 208, system integration 210, certification and delivery 212, placing the aircraft in service 214, and routine maintenance and service 216.

As shown in FIG. 11, the aircraft 202 produced by example method 200 may include an airframe 218 with a plurality of systems 220 and an interior 222. Examples of the plurality of systems 220 may include one or more of a propulsion system 224, an electrical system 226, a hydraulic system 228, and an environmental system 230. Any number of other systems may be included. The aircraft landing systems and methods for monitoring a landing of an aircraft of the present disclosure may be employed for any of the systems of the aircraft 202.

Although various embodiments of the disclosed aircraft landing systems and methods for monitoring a landing of an aircraft have been shown and described, modifications may occur to those skilled in the art upon reading the specification. The present application includes such modifications and is limited only by the scope of the claims.

What is claimed is:

1. An aircraft landing system for landing of an aircraft, the aircraft landing system comprising:
   at least one force sensor coupled with a landing gear of the aircraft for sensing a first force applied to a first portion of the landing gear and a second force applied to a second portion of the landing gear during landing at a landing zone; and
   a processor configured to receive information from the at least one force sensor corresponding to the sensed first and second forces and determine a suitability of the landing zone for landing based on the received information corresponding to the sensed first and second forces.

2. The aircraft landing system of claim 1 wherein the processor is further configured to flag for an unsuitable landing zone based on the suitability of the landing zone for landing.

3. The aircraft landing system of claim 2 wherein the processor is further configured to issue a command to a flight control system of the aircraft based on the flag for the unsuitable landing zone.

4. The aircraft landing system of claim 3 wherein the command includes signaling the flight control system of the aircraft to direct the aircraft to another landing zone.

5. The aircraft landing system of claim 2 wherein the processor is further configured to transmit an alert or command to another vehicle based on the flag for the unsuitable landing zone.

6. The aircraft landing system of claim 1 wherein the processor is further configured to receive data from at least one of an acoustic sensor and an optical sensor.

7. The aircraft landing system of claim 6 wherein the processor is further configured to analyze the force information received from the at least one force sensor and the data from the at least one of the acoustic sensor and the optical sensor.

8. The aircraft landing system of claim 7 wherein the processor is further configured to determine a suitability of the landing zone for landing based on the force information from the at least one force sensor and the data from the at least one of the acoustic sensor and the optical sensor.

9. The aircraft landing system of claim 1 wherein the at least one force sensor is positioned on a bottom of the landing gear.

10. The aircraft landing system of claim 1 wherein the aircraft is a helicopter comprising a skid, and wherein the at least one force sensor is positioned on a bottom of the skid.

11. A method for monitoring a landing of an aircraft, the method comprising:
    sensing a first force applied to a first portion of a landing gear and a second force applied to a second portion of the landing gear during landing at a landing zone; and
    determining a suitability of the landing zone for landing based on the sensed first and second forces.

12. The method of claim 11 further comprising flagging for an unsuitable landing zone based on the suitability of the landing zone for landing.

13. The method of claim 12 further comprising issuing a command to a flight control system of the aircraft based on the flag for the unsuitable landing zone.

14. The method of claim 13 wherein the command includes signaling the flight control system of the aircraft to direct the aircraft to another landing zone.

15. The method of claim 12 further comprising transmitting an alert or command to another vehicle based on the flag for the unsuitable landing zone.

16. The method of claim 11 further comprising receiving data from at least one of an acoustic sensor and an optical sensor.

17. The method of claim 16 further comprising analyzing the sensed first and second forces and the data from the at least one of the acoustic sensor and the optical sensor.

18. The method of claim 17 further comprising determining a suitability of the landing zone for landing based on the sensed first and second forces and the data from the at least one of the acoustic sensor and the optical sensor.

19. The method of claim 11 wherein at least one force sensor is coupled with the landing gear of the aircraft for sensing the first and second forces applied to the landing gear at the first and second positions during landing.

20. The method of claim 11 wherein determining a suitability of the landing zone for landing includes comparing the sensed first and second forces to a predetermined threshold corresponding to a potential landing obstacle.

21. The method of claim 11 wherein the aircraft is a helicopter comprising a skid, and wherein the at least one force sensor is positioned on a bottom of the skid.

* * * * *